US011981187B2

(12) United States Patent
Kim et al.

(10) Patent No.: US 11,981,187 B2
(45) Date of Patent: May 14, 2024

(54) HOOK ASSEMBLY FOR DOOR CURTAIN OF VEHICLE

(71) Applicants: Hyundai Motor Company, Seoul (KR); Kia Corporation, Seoul (KR); NIFCO KOREA INC., Asan-si (KR)

(72) Inventors: Min-Jung Kim, Suwon-si (KR); Jong-Woo Shim, Suwon-si (KR); Do-Won Kim, Seoul (KR); Yoo-Sung Doh, Asan-si (KR)

(73) Assignees: Hyundai Motor Company, Seoul (KR); Kia Corporation, Seoul (KR); NIFCO KOREA INC., Asan-si (KR)

( * ) Notice: Subject to any disclaimer, the term of this patent is extended or adjusted under 35 U.S.C. 154(b) by 105 days.

(21) Appl. No.: 17/726,921

(22) Filed: Apr. 22, 2022

(65) Prior Publication Data
US 2023/0008103 A1  Jan. 12, 2023

(30) Foreign Application Priority Data
Jul. 9, 2021  (KR) .......................... 10-2021-0090380

(51) Int. Cl.
*B60J 1/20* (2006.01)
*E05C 3/14* (2006.01)
*B60J 5/04* (2006.01)

(52) U.S. Cl.
CPC ............... *B60J 1/2047* (2013.01); *E05C 3/14* (2013.01); *B60J 1/2011* (2013.01); *B60J 5/0468* (2013.01)

(58) Field of Classification Search
CPC ......... B60J 1/2047; B60J 1/2013; E05C 3/14; B60R 7/10
USPC .......................................................... 296/97.8
See application file for complete search history.

(56) References Cited

U.S. PATENT DOCUMENTS

| | | | | |
|---|---|---|---|---|
| 6,324,732 B1* | 12/2001 | Arisaka | .................... | B60J 3/023 24/453 |
| 6,491,333 B2* | 12/2002 | Ichikawa | .................. | B60J 3/023 296/97.9 |
| 8,474,110 B1* | 7/2013 | Sherriff | .................. | F16B 21/086 24/297 |
| 8,579,010 B2* | 11/2013 | Medlar | .................. | B60J 1/2083 160/370.21 |
| 8,919,856 B2* | 12/2014 | Sia, Jr. | ................... | B60J 1/2047 296/97.9 |
| 9,016,642 B1* | 4/2015 | Ay | ........................... | B60R 7/10 248/205.1 |
| 9,604,579 B2* | 3/2017 | Huelke | ...................... | B60R 7/10 |
| 10,926,612 B2* | 2/2021 | Kim | ....................... | B60J 1/2033 |
| 10,988,003 B2* | 4/2021 | Baxter | ..................... | B60J 3/023 |

(Continued)

FOREIGN PATENT DOCUMENTS

| | | |
|---|---|---|
| KR | 101404959 B1 | 6/2014 |
| KR | 20200092142 A | 8/2020 |

*Primary Examiner* — Jason S Morrow
(74) *Attorney, Agent, or Firm* — Slater Matsil, LLP

(57) ABSTRACT

An embodiment hook assembly for a door curtain to be installed on a door panel of a vehicle, the hook assembly includes a hook body installed to penetrate a through hole formed in the door panel, and a hook pin having an upper end hinge-connected to an upper portion of the hook body, wherein in a state in which an upper portion of the hook pin is completely inserted into the hook body, a part of the hook body is in an opened state and the hook body is locked to a circumference of the through hole such that the hook body is fastened to the through hole.

20 Claims, 13 Drawing Sheets

(56) References Cited

U.S. PATENT DOCUMENTS

| | | | |
|---|---|---|---|
| 11,642,945 B2* | 5/2023 | Kim | ...................... B60J 1/2047 |
| | | | 160/370.22 |
| 2020/0238796 A1 | 7/2020 | Kim et al. | |
| 2023/0069762 A1* | 3/2023 | Kim | ........................ B60J 3/005 |

* cited by examiner

HOOK ASSEMBLY FOR DOOR CURTAIN OF VEHICLE

CROSS-REFERENCE TO RELATED APPLICATIONS

This application claims the benefit of Korean Patent Application No. 10-2021-0090380, filed on Jul. 9, 2021, which application is hereby incorporated herein by reference.

TECHNICAL FIELD

The present disclosure relates to a hook assembly for a door curtain of a vehicle.

BACKGROUND

As illustrated in FIGS. 1 and 2, a door glass is installed on a door 120 of a vehicle, and a door curtain 122 is installed to cover the door glass.

The door curtain 122 is used to adjust lighting or to protect a passenger's privacy, and when the door curtain 122 is drawn out from the door 120, an upper end of the door curtain 122 is locked and fixed to the door 120, thereby maintaining a deployed state. The door curtain 122 is fixed by allowing a shade bar 122a installed on the upper end of the door curtain 122 to be locked to a hook assembly no installed on a door panel 121.

The hook assembly no includes a hook body in having the door curtain 122 fixed thereto, and a hook pin 112 fixed to the door panel 121 of the door 120 to have the hook body in fastened thereto. The hook pin 112 is fixed to the door panel 121 by a base 112a and a grip part 112b formed on the hook pin 112. The hook body 111 is formed with a base 111a and a fastening part 111d extending upward from the base 111a, and a curtain fixing part 111b having the door curtain 122 fixed thereto is formed under the base 111a. In the state where the hook pin 112 is fixed to the door panel 121, the hook body 111 is preliminarily fastened by pushing the hook pin 112 from bottom to top (see FIG. 3A). The preliminarily fastened state is a state where an upper portion of the fastening part 111d is inserted into the grip part 112b, and a state before a lower portion of the fastening part 111d is inserted into the grip part 112b (see, e.g., distance C in FIG. 3A), and the grip part 112b maintains a state perpendicular to the base 112a of the hook pin 112 like a line L.

Thereafter, when the hook body 111 is completely fastened (see FIG. 3B), the fastening part 111d is inserted into the grip part 112b, and a coupling part 111c of the hook body in and a coupling part 112c of the hook pin 112 are coupled, and the grip part 112b is opened outward by an angle $\alpha$ or an angle $\beta$ (see Line L') and therefore, the hook pin 112 is not separated from the door panel 121 and is fixed thereto.

However, the hook assembly no according to the related art has a non-uniform fastening force of fastening the hook pin 112 to the door panel 121 depending upon a size of a through hole formed in the door panel 121 and a thickness dispersion of the door panel 121.

Further, since the hook body in should be fastened upward such that the grip part 112b may be opened, the fastening force is excessively required and the assembling is difficult.

Further, the fastening force and a load (force of the door curtain being wound into the door) simultaneously act on the hook pin 112 in opposite directions, such that there occurs a phenomenon in which the hook assembly no is separated from the door panel 121 or the hook assembly no is damaged when the door curtain 122 is fixed to the hook assembly 110.

The contents described in this section are to aid in the understanding of the background of the present disclosure, and may include what is not previously known to those skilled in the art to which the present disclosure pertains.

SUMMARY

The present disclosure relates to a hook assembly for a door curtain of a vehicle for fixing a door curtain installed on a door of a vehicle. Particular embodiments relate to a hook assembly for a door curtain of a vehicle that facilitates assembling, has a uniform fastening force, and prevents a door curtain from being separated or damaged in use.

Embodiments of the present disclosure can solve problems associated with the related art, and an embodiment of the present disclosure provides a hook assembly for a door curtain of a vehicle that may absorb a dispersion of a size of a through hole formed in a door panel to exert a constant fastening force.

A hook assembly for a door curtain of a vehicle installed on a door panel and having an upper end of the door curtain drawn out from a door locked and fixed thereto includes a hook body installed to penetrate a through hole formed in the door panel and a hook pin having an upper end hinge-connected to an upper portion of the hook body, in which when an upper portion of a hook pin may be completely inserted into the hook body, a part of the hook body may be opened and the hook body may be locked to a circumference of the through hole, and therefore, the hook body may be fastened to the through hole.

The hook body includes a base contacting a bottom surface of the door panel, a fastening part formed upward from the base, positioned to penetrate the through hole formed in the door panel, and having an insertion groove formed therein, and a fixing wing part extending from an upper end of the fastening part in a downward direction, and when the upper portion of the hook pin may be completely inserted into the hook body, the fixing wing part may be locked to the circumference of the through hole while the fixing wing part may be opened, and therefore, the hook body may be fastened to the through hole.

The hook assembly for the door curtain further includes an extension extending downward from one end of the base and a curtain fixing part extending from a lower end of the extension and having the upper end of the door curtain latched and fixed thereto.

The fixing wing part may be formed with an upper inclined surface whose width increases from a position spaced apart from the upper end of the fixing wing part downward, and a lower inclined surface whose width decreases from a lower end of the upper inclined surface downward, and when the fixing wing part may be opened in the longitudinal direction of the vehicle, the lower inclined surface closely contacts the circumference of the through hole and the hook body may be fastened to the through hole.

The hook pin includes an insertion part inserted into the insertion groove and a lever part extending from a lower end of the insertion part downward.

The hook pin has a rotary shaft formed on an upper end of the insertion part, the hook body has a shaft insertion hole in the longitudinal direction of the vehicle formed on the upper end of the fastening part, and the rotary shaft may be fitted into the shaft insertion hole and the hook pin may be rotatably coupled to the hook body.

A fixing projection may be formed on both side surfaces of the insertion part to protrude in the longitudinal direction of the vehicle, and when the insertion part may be inserted into the insertion groove of the fastening part as much as possible, the fixing projection opens the fixing wing part to both sides of the fastening part.

The lever part may be formed to be inclined downward to face an outside of the vehicle in a width direction with respect to the insertion part.

When the lever part may be operated in a state where the fastening part may be inserted into the insertion part and preliminarily fastened thereto, the insertion part may be completely fastened to the insertion groove of the fastening part while the hook pin rotates toward the inside of the vehicle.

An accommodation groove configured to accommodate the lever part may be formed on the extension.

A coupling projection may be formed on an upper end of the lever part, and when the lever part may be inserted into the accommodation groove, a coupling hole into which the coupling projection may be inserted may be formed in one side of the base.

The hook assembly for the door curtain further includes a support part extending to be inclined downward from the upper end of the fastening part toward the inside of the vehicle in the width direction, in which when the fastening part penetrates the through hole, a lower end of the support part may be locked to the circumference of the through hole while the lower portion of the support part may be retracted to the outside of the vehicle in the width direction, and therefore, the hook body may be fastened to the through hole.

According to the hook assembly for the door curtain of the vehicle according to embodiments of the present disclosure having the above configuration, it is possible to absorb the dispersion of the through hole formed in the door panel only by fastening the hook body to the hook pin, thereby preventing the clearance of the hook assembly in the door panel, and preventing the phenomenon in which the hook assembly may be separated from the door panel or the hook assembly may be damaged.

DETAILED DESCRIPTION OF ILLUSTRATIVE EMBODIMENTS

Figure 1:
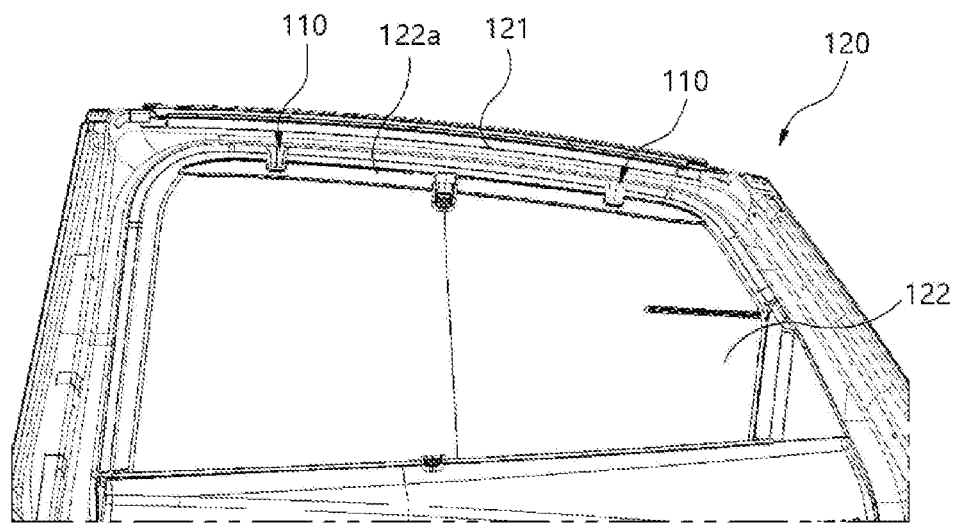
FIG. 1 is a schematic diagram illustrating a state where a door curtain is installed on a door of a vehicle.
Figure 2:
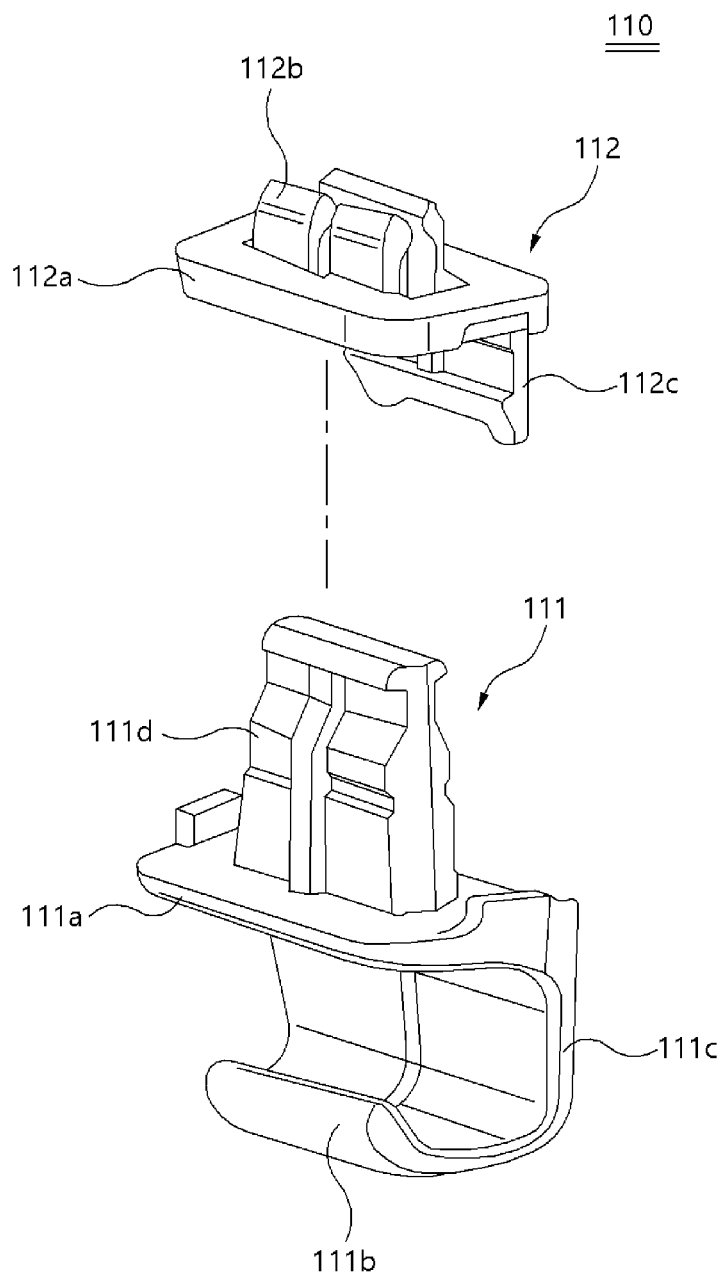
FIG. 2 is an exploded perspective diagram of a hook assembly according to the related art.
Figure 3A:
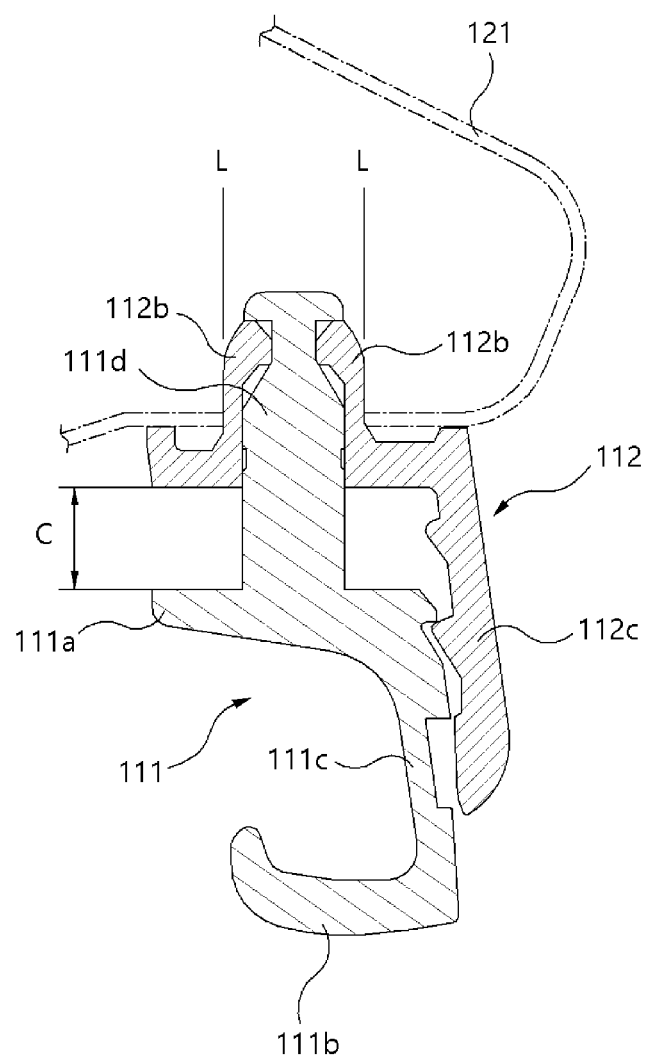
FIG. 3A is a cross-sectional diagram illustrating a state where the hook assembly according to the related art is preliminarily assembled to the door.
Figure 3B:
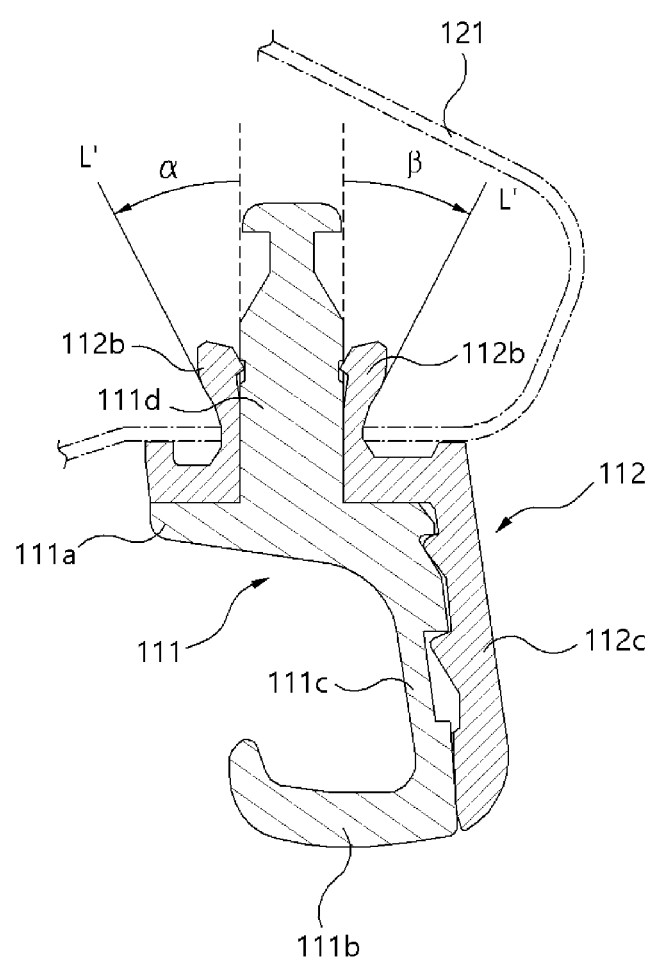
FIG. 3B is a cross-sectional diagram illustrating a state where the hook assembly according to the related art is assembled to the door.
Figure 4:
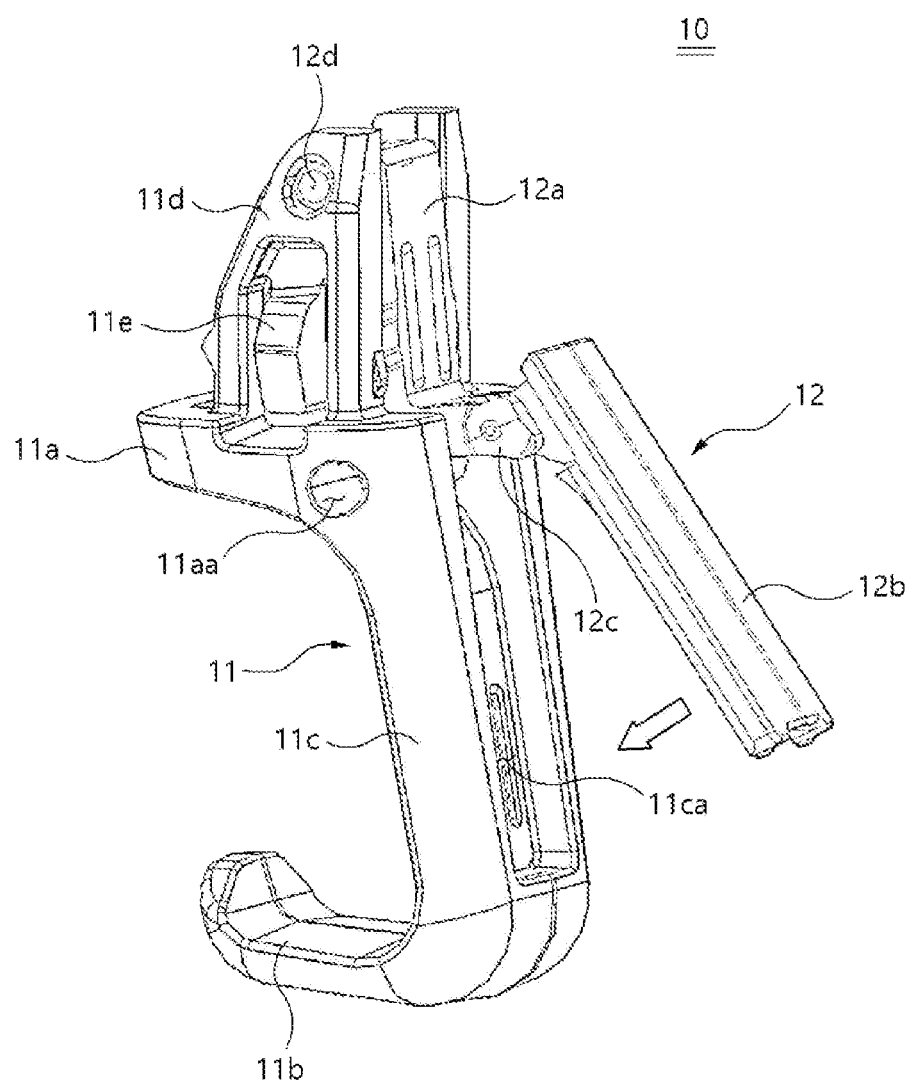
FIG. 4 is a perspective diagram illustrating a hook assembly for a door curtain of a vehicle according to an embodiment of the present disclosure.
Figure 5:
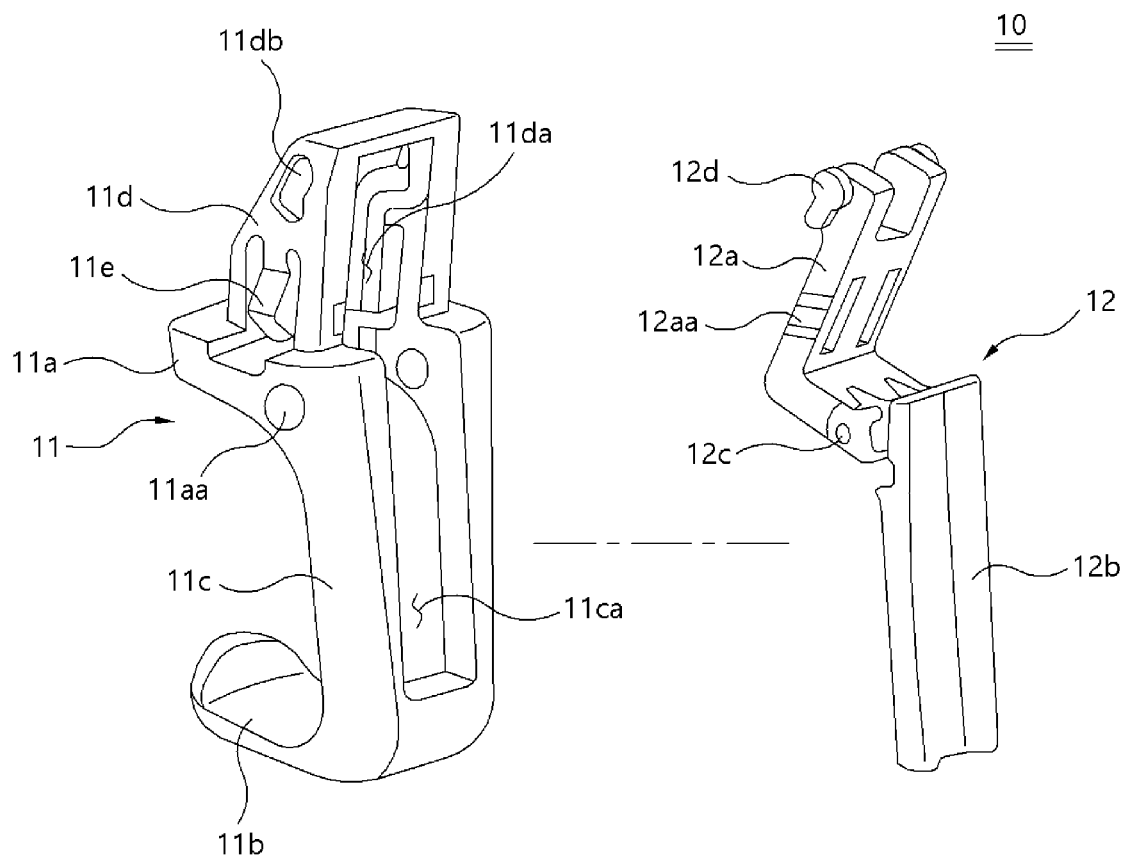
FIG. 5 is an exploded perspective diagram illustrating the hook assembly for the door curtain of the vehicle according to an embodiment of the present disclosure.

Hereinafter, a hook assembly for a door curtain of a vehicle according to embodiments of the present disclosure will be described in detail with reference to the accompanying drawings.

Referring to FIGS. 4-9, a hook assembly for a door curtain of a vehicle according to embodiments of the present disclosure includes a hook body 11 fixed to the door panel 21 by penetrating a through hole 21a formed in the door panel 21, and a hook pin 12 having an upper end hinge-connected to an upper portion of the hook body 11 and opening the hook body 11 outward when inserted into the hook body 11, and when the hook pin 12 may be inserted into the hook body 11, the hook body 11 may be fastened to the through hole 21a while being opened outward in the hook assembly for the door curtain of the vehicle installed on a door panel 21 to allow an upper end of the door curtain drawn out from a door to be locked.

The hook body 11 may be installed to penetrate the through hole 21a formed in the door panel 21.

The base 11a contacts a bottom surface of the door panel 21. Since the base 11a is formed to be larger than the through hole 21a, the base 11a may not penetrate the through hole 21a and may be positioned to contact the bottom surface of the door panel 21. A coupling hole 11aa into which a coupling projection 12C of the hook pin 12 to be described later is inserted may be formed on an end of the base 11a positioned outside the vehicle or a portion adjacent thereto.

An extension 11c may be formed to extend from one side of the base 11a downward. The extension 11c may be formed to extend downward from the end of the base 11a positioned outside the vehicle.

An accommodation groove 11ca configured to accommodate and fix a lever part 12b of the hook pin 12 to be described later may be formed on a rear surface of the extension 11c, that is, a surface of the extension 11c facing the outside of the vehicle.

A curtain fixing part 11b may be positioned under the base 11a to fix the upper end of the door curtain. The curtain fixing part 11b as a low end of the extension 11c may be formed to extend into the vehicle to allow a shade bar installed on the upper end of the door curtain to be locked, thereby allowing the upper end of the door curtain to be fixed.

A fastening part 11*d* may be formed on an upper portion of the base 11*a*. The fastening part 11*d* extends from the base 11*a* upward, and is positioned through the through hole 21*a* formed in the door panel 21. The base 11*a* and the fastening part 11*d* are positioned under and above the door panel 21, respectively.

An insertion groove 11*da* configured to accommodate an insertion part 12*a* of the hook pin 12 and a shaft insertion hole 11*db* into which a rotary shaft 12*d* formed on an upper end of the hook pin 12 may be inserted are formed in the fastening part 11*d* in a longitudinal direction of the vehicle.

A fixing wing part 11*e* may be formed on a side surface of the fastening part 11*d*, preferably, both side surfaces of the fastening part 11*d*, respectively. The fixing wing part 11*e* has an upper end connected to the fastening part 11*d*, and a side surface and a lower end formed in a state of being separated from the fastening part 11*d*. Therefore, the fixing wing part 11*e* has a structure in which a lower end thereof may be opened outward around a fixed upper end.

The fixing wing part 11*e* has an inclined surface 11*ea*, neb formed on an outer surface thereof. The outer surface of the fixing wing part 11*e* may be formed with an upper inclined surface 11*ea* whose width increases downward from a position spaced apart from the upper end of the fixing wing part ne, and a lower inclined surface neb whose width decreases downward from a lower end of the upper inclined surface 11*ea*.

When the fastening part 11*d* is inserted into the through hole 21*a*, the upper inclined surface 11*ea* allows the fixing wing part 11*e* to enter into the fastening part 11*d*, such that the fastening part 11*d* may be easily inserted into the through hole 21*a*.

The lower inclined surface neb allows the lower inclined surface neb to be supported by a circumference of the through hole 21*a*, such that the fastening part 11*d* maintains the state of being fastened to the through hole 21*a*.

Further, the fastening part 11*d* may be formed with a support part 11*dc* extending from an upper end of the fastening part 11*d* downward. The support part 11*dc* extends to be inclined downward into the vehicle in a width direction between two fixing wing parts 11*e*. The support part 11*dc* may be formed to be inclined into the vehicle in the width direction from an upper end thereof toward a lower portion thereof.

The support part 11*dc* has a lower end that contacts one side of the through hole 21*a* to allow the hook assembly 10 to absorb the clearance in the width direction of the vehicle. Since only an upper end of the support part 11*dc* is fixed to the fastening part 11*d*, a lower end thereof has the same form as a free end of a cantilever. Therefore, the support part 11*dc* may be elastically deformed according to the size of the through hole 21*a*, and the lower end of the support part 11*dc* may be retracted to contact the circumference of the through hole 21*a* when the hook body 11 penetrates the door panel 21. Therefore, when the hook assembly 10 is assembled, the support part 11*dc* allows the hook body 11 to be fastened to the through hole 21*a* in a direction different from the fixing wing part 11*e* and absorbs the clearance of the vehicle in the width direction.

The hook pin 12 may be rotatably installed on the hook body 11, and when the hook pin 12 is inserted into the hook body 11 by the rotation, the hook body 11 maintains the state of being fastened to the door panel 21.

The insertion part 12*a* may be inserted into the fastening part 11*d* of the hook body 11. The insertion part 12*a* allows the fixing wing part 11*e* to be opened when the insertion part 12*a* is inserted into the insertion groove 11*da* formed in the fastening part 11*d*, thereby allowing the hook body 11 not to be separated from the through hole 21*a*. At this time, the insertion part 12*a* allows the fixing wing part 11*e* to be opened in a direction perpendicular to the direction into which the insertion part 12*a* is inserted.

To this end, a fixing projection 12*aa* configured to allow the insertion part 12*a* to be opened to the outside of the fixing wing part 11*e* may be formed to protrude from both side surfaces of the insertion part 12*a*.

The rotary shaft 12*d* may be formed on an upper end of the insertion part 12*a*. The rotary shaft 12*d* may be inserted into the shaft insertion hole 11*db*, and therefore, the hook pin 12 becomes a rotation center rotated from the hook body 11.

The lever part 12*b* may be formed to extend from a lower end of the insertion part 12*a* downward.

The lever part 12*b* may be formed to be inclined toward the outside of the vehicle in the width direction with respect to the insertion part 12*a*.

When the insertion part 12*a* presses the lever part 12*b* in the state where the fastening part 11*d* is inserted and preliminarily fastened, the hook pin 12 rotates around the rotary shaft 12*d* to be completely fastened.

Since the lever part 12*b* is not formed to be parallel with an upper portion of the insertion part 12*a*, and is formed at a certain angle, the lever part 12*b* may be in a state of being spaced apart from the extension 11*c* in the state where the hook pin 12 is preliminarily fastened, but when the lever part 12*b* is operated toward the extension 11*c*, the hook pin 12 rotates, and therefore, the lever part 12*b* may be inserted into the accommodation groove 11*ca* of the extension 11*c* as much as possible to complete the fastening.

An upper end of the lever part 12*b* may be formed with the coupling projection 12*c* configured to prevent the lever part 12*b* from being separated from the accommodation groove 11*ca* while maintaining the state of being inserted into the accommodation groove 11*ca* when the lever part 12*b* is inserted into the accommodation groove 11*ca*. The coupling projection 12C may be inserted into the coupling hole 11*aa*, such that the lever part 12*b*, maintains the state where the lever part 12*b* is inserted into the accommodation groove 11*ca*.

Figure 6:
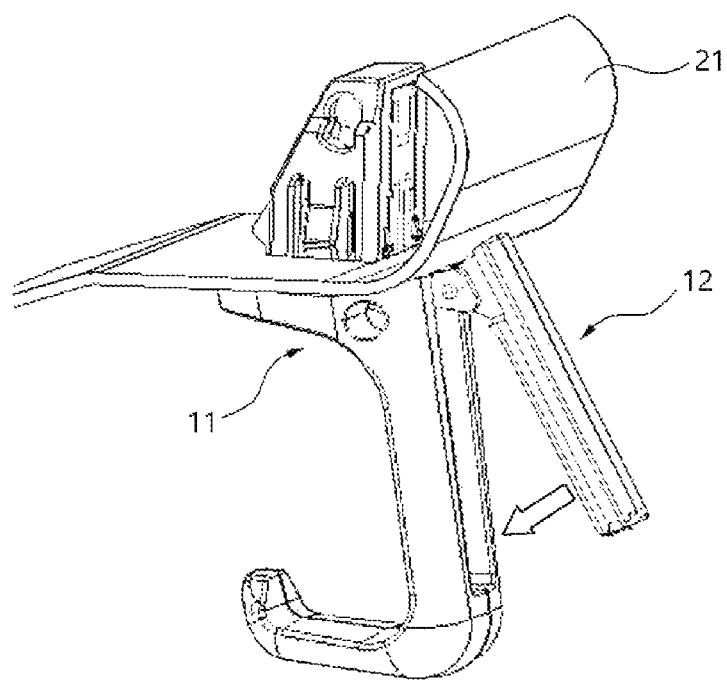
FIG. 6 is a perspective diagram illustrating a state where the hook assembly for the door curtain of the vehicle according to an embodiment of the present disclosure is preliminarily assembled to a door panel.
Figure 7:
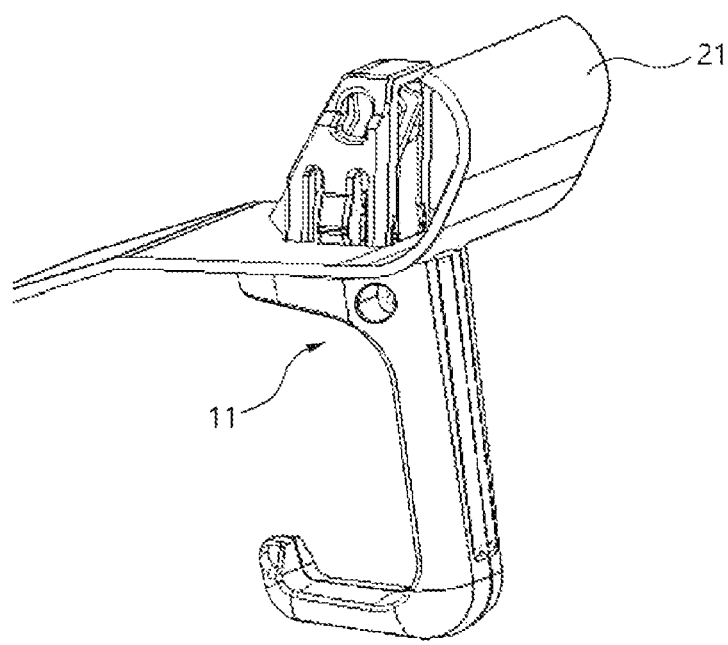
FIG. 7 is a perspective diagram illustrating a state where the hook assembly for the door curtain of the vehicle according to an embodiment of the present disclosure is assembled to the door panel.
Figure 8:
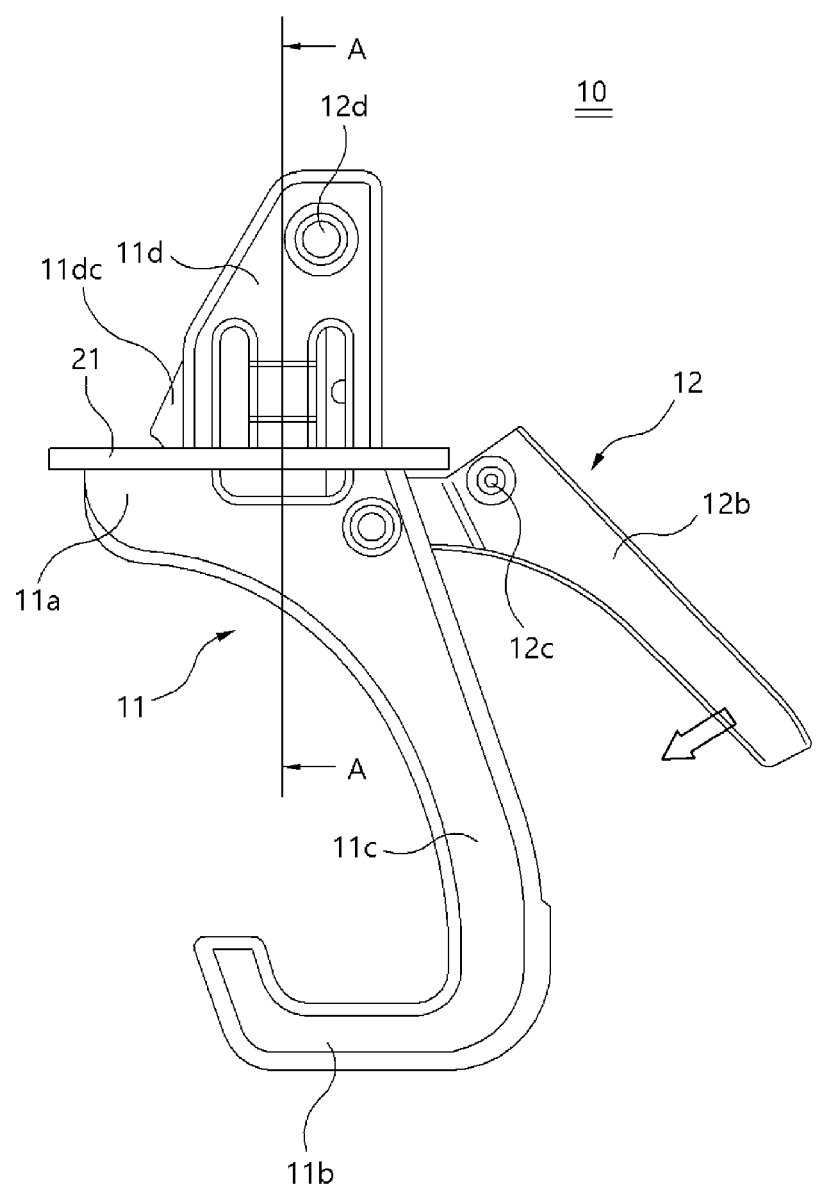
FIG. 8 is a cross-sectional diagram illustrating a state where the hook assembly for the door curtain of the vehicle according to an embodiment of the present disclosure is preliminarily assembled to the door panel.
Figure 9:
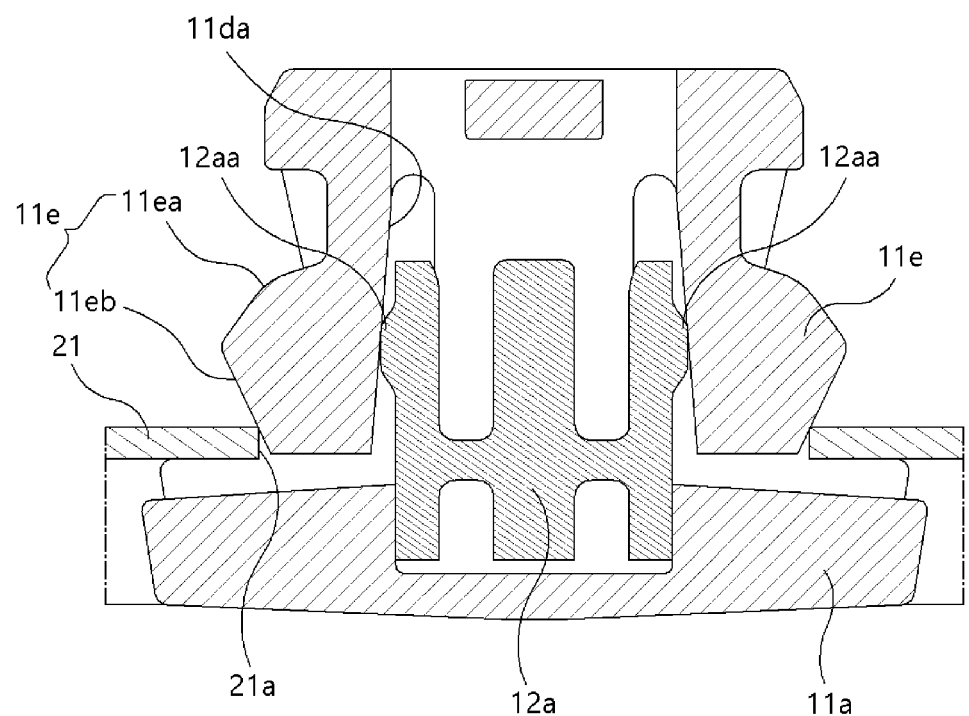
FIG. 9 is a cross-sectional diagram taken along line A-A of FIG. 8.

The hook assembly according to embodiments of the present disclosure having the above configuration may be preliminarily assembled by penetrating the through hole 21*a* of the door panel 21 in the state where the hook pin 12 is preliminarily fastened to the hook body 11 (see FIG. 6). In the preliminarily fastened state where the fastening part 11*d* of the hook body 11 is inserted into the insertion part 12*a* of the hook pin 12, and the lever part 12*b* of the hook pin 12 may be not inserted into the accommodation groove 11*ca* of the hook body 11, the assembly of the hook body 11 and the hook pin 12 may be preliminarily assembled by penetrating the through hole 21*a* of the door panel 21.

Thereafter, the lever part 12*b*, of the hook pin 12 may be rotated such that the lever part 12*b* may be inserted into the accommodation groove 11*ca*. When the lever part 12*b* is inserted, the hook pin 12 may be completely fastened to the hook body 11, and the coupling projection 12C may be inserted into the coupling hole 11*aa*.

In particular, as the insertion part 12*a* is completely inserted into the fastening part 11*d*, the fixing projection 12*aa* formed on both side surfaces of the insertion part 12*a* pressurizes the fixing wing part 11*e* outward. When the fixing wing part 11*e* is pressurized outward, the fixing wing part 11*e* may be opened outward, and a circumference of the lower inclined surface 11*eb* of the fixing wing part 11*e* contacts the through hole 21*a* of the door panel 21, and therefore, the assembly of the hook body 11 and the hook pin 12, that is, the hook assembly 10 may be fastened to the through hole 21a of the door panel 21.

If the hook assembly 10 is assembled by rotating the lever part 12b, the fixing wing part 11e may be about to be opened outward by the fixing projection 12aa, but the lower inclined surface 11eb of the fixing wing part 11e may be constrained by the through hole 21a, thereby exerting a strong fastening force even with a lesser operating force. If the lever part 12b is rotated by pressing the lower end thereof, the lever part 12b may be positioned at a position spaced apart from the rotary shaft 12d rather than a portion where the fixing projection 12aa is formed, thereby exerting the strong fastening force while completely fastening the hook body 11 and the hook pin 12 with the lesser operating force by a principle of the lever.

Further, according to embodiments of the present disclosure, it is possible to prevent the clearance regardless of the size of the through hole 21a, and to exert the constant fastening force and absorb the dispersion of the size of the through hole 21a by allowing the hook assembly 10 to closely contact the door panel 21.

Figure 10A:
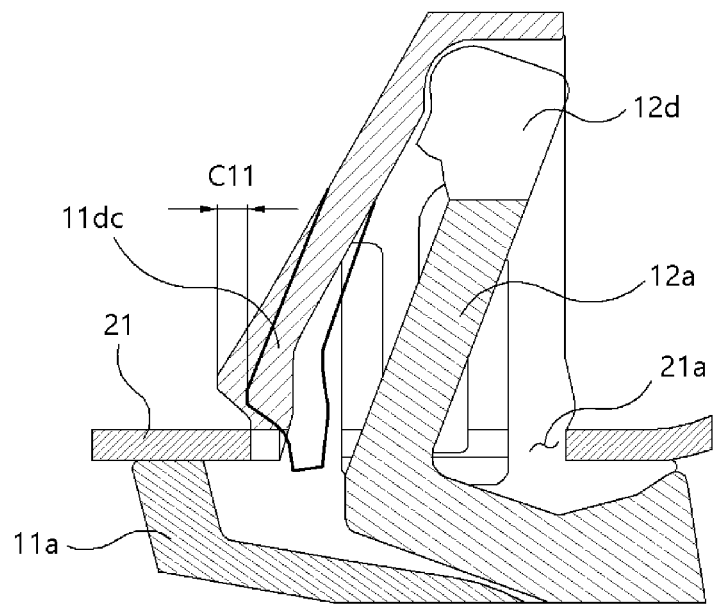
FIGS. 10A to 10C are cross-sectional diagrams illustrating a structure of absorbing a manufacturing dispersion in an L direction in the hook assembly for the door curtain of the vehicle according an embodiment of to the present disclosure.
Figure 10B:
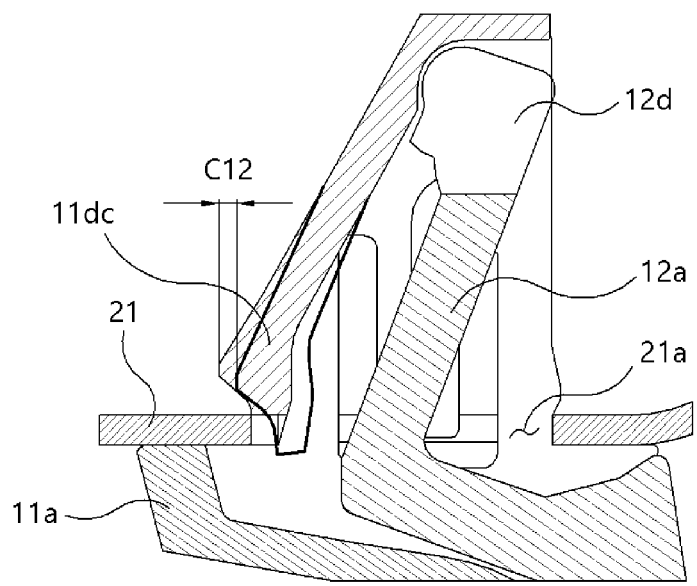
Figure 10C:
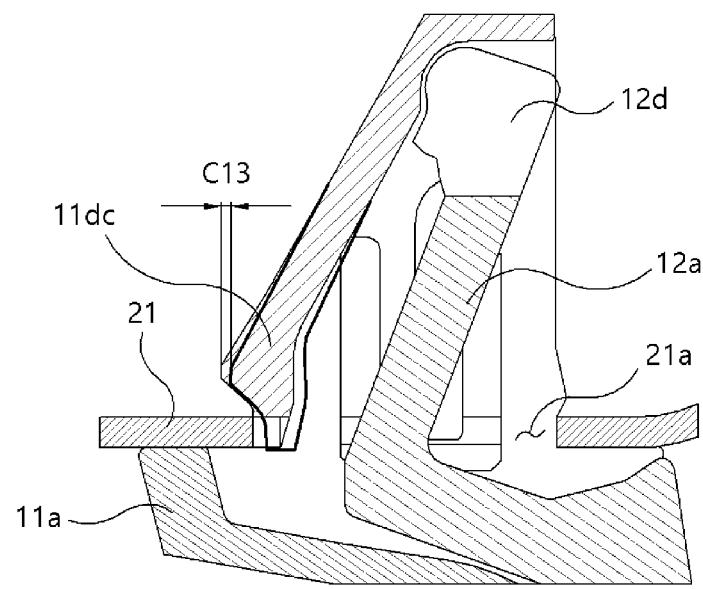

FIGS. 10A to 10C illustrate a principle of absorbing the dispersion of the size of the through hole 21a in the L direction (width direction of the vehicle). FIG. 10A illustrates a state where the through hole 21a is processed to be smaller than a fixed value, FIG. 10B illustrates a state where the through hole 21a is processed at the fixed value, and FIG. 10C illustrates a state where the through hole 21a is processed to be greater than the fixed value.

As described above, even if the sizes of the through hole 21a are differently formed by the manufacturing dispersion, the degree at which the support part 11dc is opened may be adjusted, thereby carrying out the fastening without clearance. In other words, FIGS. 10A to 10C illustrate an amount of overlap as C11, C12, and C13, respectively, and as the degree at which the support part 11dc is retracted varies depending upon the size of the through hole 21a, the hook assembly 10 may be fastened to the through hole 21a without clearance while the amount of overlap between the support part 11dc and the through hole 21a varies. For example, when the through hole 21a is greater than the fixed value (see FIG. 10A) compared to a case where the through hole 21a is formed at the fixed value (see FIG. 10B), the support part 11dc may be less retracted, thereby removing the clearance. Conversely, when the through hole 21a is formed to be greater than the fixed value (see FIG. 10C), the support part 11dc may be further retracted, thereby canceling the clearance.

Figure 11A:
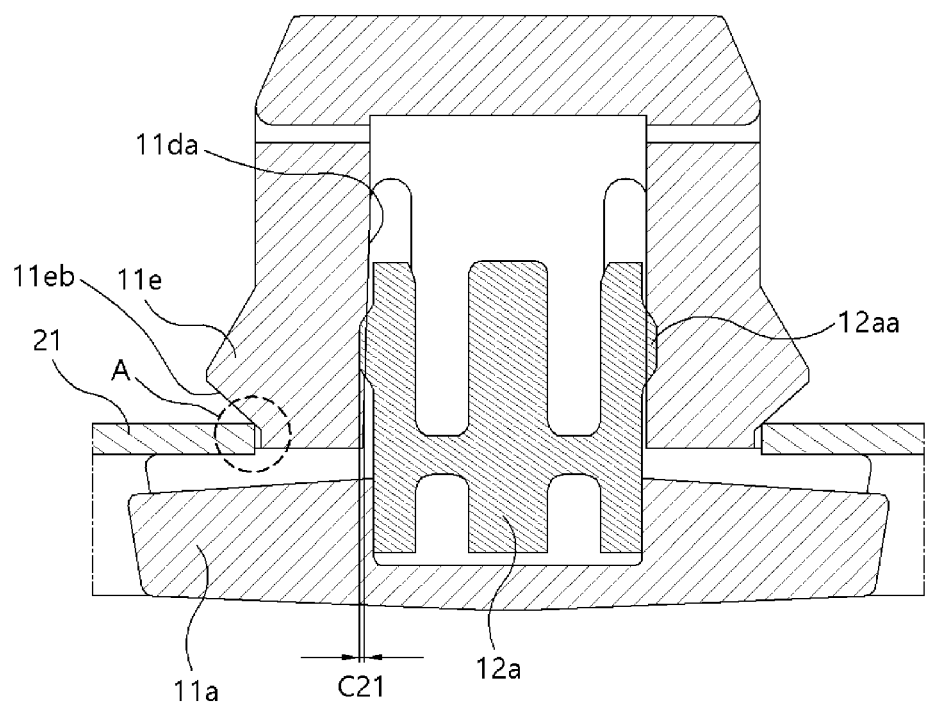
FIGS. 11A to 11C are cross-sectional diagrams illustrating a structure of absorbing a manufacturing dispersion in a T direction in the hook assembly for the door curtain of the vehicle according to an embodiment of the present disclosure.
Figure 11B:
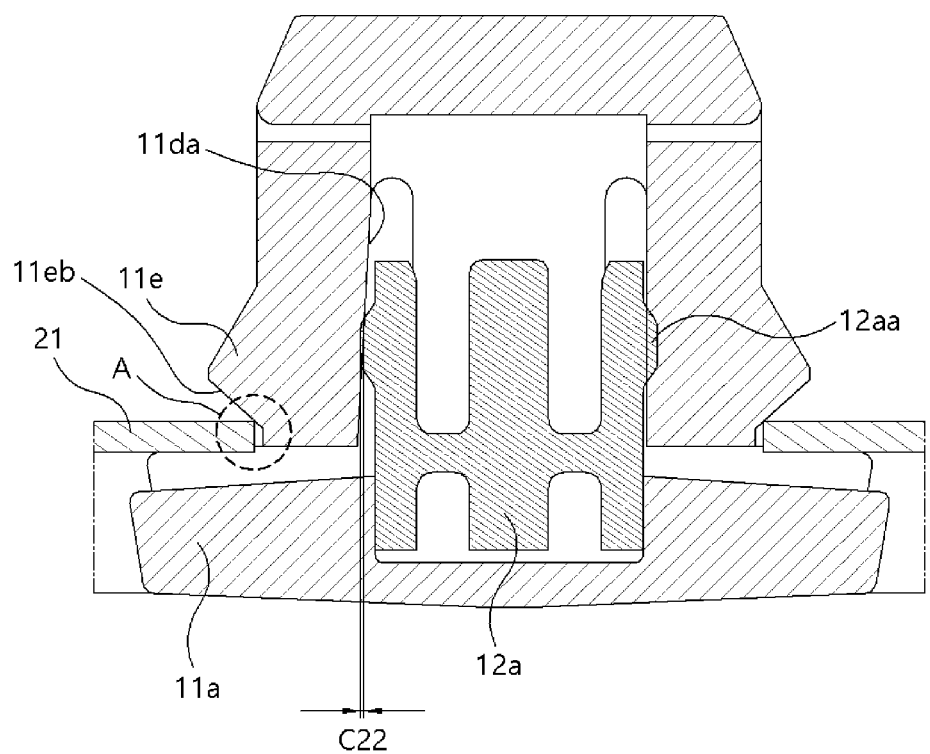
Figure 11C:
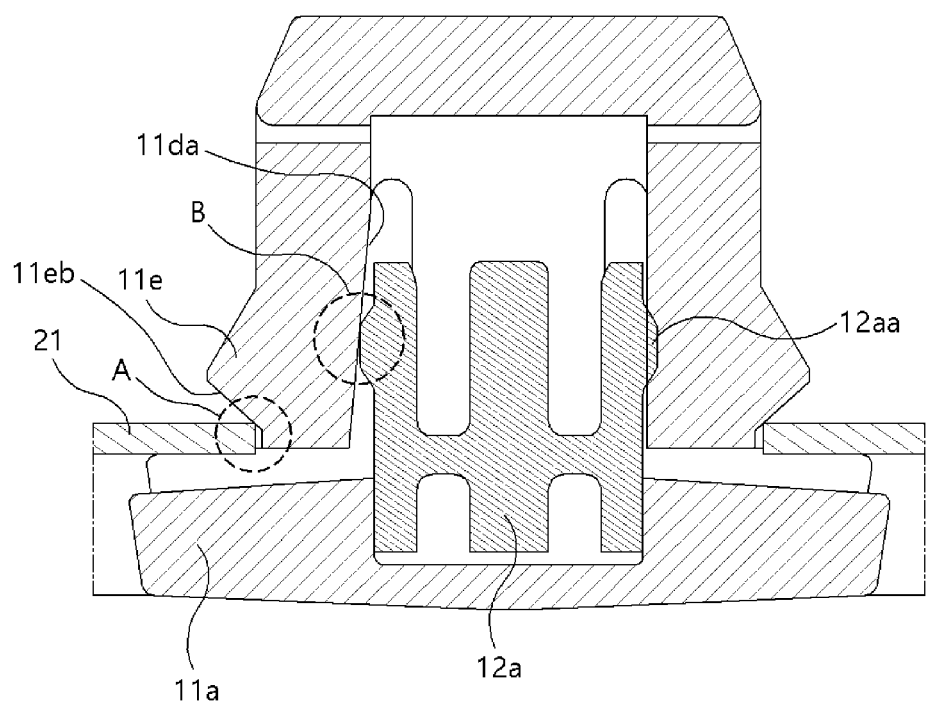

FIGS. 11A to 11C illustrate a principle of absorbing the dispersion of the size of the through hole 21a in a T direction (longitudinal direction of the vehicle). FIG. 11A illustrates a state where the through hole 21a is processed to be smaller than the fixed value, FIG. 11B illustrates a state where the through hole 21a is processed at the fixed value, and FIG. 11C illustrates a state where the through hole 21a is processed to be greater than the fixed value.

When the through hole 21a is formed to be smaller than the fixed value (see FIG. 11A), the lower inclined surface neb closely contacts the circumference of the through hole 21a while the fixing wing part 11e is less opened outward (portion A of FIG. 11A) compared to a case where the through hole 21a is formed at the fixed value (see FIG. 11B), and the amount of overlap between an inner surface of the insertion groove 11da and the fixing projection 12aa (C21) becomes the maximum to absorb the clearance in the longitudinal direction of the vehicle. When the size of the through hole 21a is the fixed value, the lower inclined surface neb closely contacts the circumference of the through hole 21a while the fixing wing part 11e is further opened outward (portion A of FIG. 11B), the amount of overlap between the inner surface of the insertion groove 11da and the fixing projection 12aa decreases. If the size of the through hole 21a is formed to be greater than the fixed value (see FIG. 11C), the lower inclined surface neb contacts the circumference of the through hole 21a while the fixing wing part 11e is much further opened outward (portion A of FIG. 11C), and the overlap between the inner surface of the insertion groove 11da and the fixing projection 12aa does not occur and the inner surface of the insertion groove 11da and the fixing projection 12aa are in contact (portion B of FIG. 11C). As described above, even if the sizes of the through hole 21a are differently formed by the manufacturing dispersion, it is possible to absorb the clearance in the longitudinal direction of the vehicle even without separate adjustment. In other words, the fixing projection 12aa opens the fixing wing part 11e outward in the process in which the insertion part 12a is inserted into the fastening part 11d by operating the lever part 12b, and the lower inclined surface neb closely contacts the circumference of the through hole 21a and may be supported thereby, and therefore, the degree at which the fixing wing part 11e is opened may be adjusted, thereby carrying out the fastening without the clearance even if the sizes of the through hole 21a are differently formed by the manufacturing dispersion.

As described above, even if the sizes of the through hole 21a are differently formed by the manufacturing dispersion, this is absorbed in the process in which the hook assembly 10 is assembled to the door panel 21, and therefore, the clearance does not occur between the hook assembly 10 and the door panel 21.

What is claimed is:

1. A hook assembly for a door curtain to be installed on a door panel of a vehicle, the hook assembly comprising:
   a hook body installed to penetrate a through hole formed in the door panel; and
   a hook pin having an upper end hinge-connected to an upper portion of the hook body and configured to open the hook body outward when inserted into the hook body;
   wherein the hook body comprises:
      a base contacting a bottom surface of the door panel;
      a fastening part formed upward from the base, positioned to penetrate the through hole formed in the door panel, and having an insertion groove formed therein; and
      a fixing wing part extending in a downward direction from an upper end of the fastening part;
   wherein the hook pin comprises an insertion part inserted into the insertion groove and a lever part extending downward from a lower end of the insertion part;
   wherein, in a preliminarily fastened state, the fastening part of the hook body is inserted into the insertion part of the hook pin while the lever part is not inserted into the hook body; and
   wherein, in a completely fastened state, an upper portion of the hook pin is inserted into the hook body and the fixing wing part is locked to the circumference of the through hole while the fixing wing part is opened such that the hook body is fastened to the through hole.

2. The hook assembly of claim 1, further comprising:
   an extension extending downward from one end of the base; and a curtain fixing part extending from a lower end of the extension and having an upper end of the door curtain locked and fixed thereto.

3. The hook assembly of claim 2, wherein the fixing wing part includes:
an upper inclined surface having a width that increases from a position spaced apart from the upper end of the fixing wing part downward; and
a lower inclined surface having a width that decreases from a lower end of the upper inclined surface downward.

4. The hook assembly of claim 3, wherein in a state in which the fixing wing part is opened in a longitudinal direction of the vehicle, the lower inclined surface closely contacts a circumference of the through hole and the hook body is fastened to the through hole.

5. The hook assembly of claim 1, wherein:
the hook pin has a rotary shaft formed on an upper end of the insertion part;
the hook body has a shaft insertion hole in a longitudinal direction of the vehicle formed on an upper end of the fastening part; and
the rotary shaft is fitted into the shaft insertion hole and the hook pin is rotatably coupled to the hook body.

6. The hook assembly of claim 1, wherein:
a fixing projection is formed on both side surfaces of the insertion part to protrude in a longitudinal direction of the vehicle; and
in a state in which the insertion part is inserted into the insertion groove of the fastening part, the fixing projection is configured to open the fixing wing part to both sides of the fastening part.

7. The hook assembly of claim 1, wherein the lever part is inclined downward to face an outside of the vehicle in a width direction with respect to the insertion part.

8. The hook assembly of claim 1, wherein when the lever part is operated in a state in which the fastening part is inserted into the insertion part and preliminarily fastened thereto, the insertion part is configured to be completely fastened to the insertion groove of the fastening part while the hook pin rotates toward an inside of the vehicle.

9. The hook assembly of claim 1, wherein the extension comprises an accommodation groove configured to accommodate the lever part.

10. The hook assembly of claim 9, wherein:
a coupling projection is formed on an upper end of the lever part; and
in a state in which the lever part is inserted into the accommodation groove, a coupling hole into which the coupling projection is inserted is formed in one side of the base.

11. A hook assembly for a door curtain to be installed on a door panel of a vehicle, the hook assembly comprising:
a hook body installed to penetrate a through hole formed in the door panel, wherein the hook body comprises:
a base contacting a bottom surface of the door panel;
a fastening part formed upward from the base, positioned to penetrate the through hole formed in the door panel, and having an insertion groove formed therein; and
a fixing wing part extending in a downward direction from an upper end of the fastening part;
a hook pin having an upper end hinge-connected to an upper portion of the hook body and configured to open the hook body outward when inserted into the hook body; and a support part extending to be inclined downward from the upper end of the fastening part toward an inside of the vehicle in a width direction;
wherein the hook pin comprises an insertion part inserted into the insertion groove and a lever part extending downward from a lower end of the insertion part;
wherein, in a preliminarily fastened state, the fastening part of the hook body is inserted into the insertion part of the hook pin while the lever part is not inserted into the hook body; and
wherein, in a completely fastened state, an upper portion of the hook pin is inserted into the hook body and the fixing wing part is locked to the circumference of the through hole while the fixing wing part is opened such that the hook body is fastened to the through hole.

12. The hook assembly of claim 11, wherein in a state in which the fastening part penetrates the through hole, a lower end of the support part is locked to the circumference of the through hole while a lower portion of the support part is retracted to an outside of the vehicle in the width direction such that the hook body is fastened to the through hole.

13. A vehicle comprising:
a vehicle body;
a door coupled to the vehicle body;
a door panel coupled to the door and having a through hole formed therein;
a door curtain coupled to the door panel by a hook assembly;
wherein the hook assembly comprises:
a hook body comprising a base in contact with a bottom surface of the door panel, a fastening part formed upward from the base, positioned to penetrate the through hole in the door panel, and having an insertion groove formed therein, and a fixing wing part extending in a downward direction from an upper end of the fastening part;
a hook pin having an upper end hinge-connected to an upper portion of the hook body;
an extension extending downward from one end of the base; and
a curtain fixing part extending from a lower end of the extension and having an upper end of the door curtain locked and fixed thereto;
wherein the hook pin comprises an insertion part inserted into the insertion groove and a lever part extending downward from a lower end of the insertion part;
wherein, in a preliminarily fastened state, the fastening part of the hook body is inserted into the insertion part of the hook pin while the lever part is not inserted into the hook body; and
wherein, in a completely fastened state, an upper portion of the hook pin is inserted into the hook body and the fixing wing part is locked to the circumference of the through hole while the fixing wing part is opened such that the hook body is fastened to the through hole.

14. The vehicle of claim 13, wherein the fixing wing part includes:
an upper inclined surface having a width that increases from a position spaced apart from the upper end of the fixing wing part downward; and
a lower inclined surface having a width that decreases from a lower end of the upper inclined surface downward; and
wherein in the state in which the fixing wing part is in an opened state in a longitudinal direction of the vehicle, the lower inclined surface closely contacts the circumference of the through hole such that the hook body is fastened to the through hole.

15. The vehicle of claim 14, wherein:
the hook pin has a rotary shaft formed on an upper end of the insertion part;
the hook body has a shaft insertion hole in a longitudinal direction of the vehicle formed on an upper end of the fastening part;
the rotary shaft is fitted into the shaft insertion hole and the hook pin is rotatably coupled to the hook body;
a fixing projection is formed on both side surfaces of the insertion part to protrude in the longitudinal direction of the vehicle; and
in a state in which the insertion part is inserted into the insertion groove of the fastening part, the fixing projection is configured to open the fixing wing part to both sides of the fastening part.

16. The vehicle of claim 14, wherein:
the lever part is inclined downward to face an outside of the vehicle in a width direction with respect to the insertion part; and
when the lever part is operated in a state in which the fastening part is inserted into the insertion part and preliminarily fastened thereto, the insertion part is configured to be completely fastened to the insertion groove of the fastening part while the hook pin rotates toward an inside of the vehicle.

17. The vehicle of claim 14, wherein:
the extension comprises an accommodation groove configured to accommodate the lever part;
a coupling projection is formed on an upper end of the lever part; and
in a state in which the lever part is inserted into the accommodation groove, a coupling hole into which the coupling projection is inserted is formed in one side of the base.

18. The hook assembly of claim 11, wherein:
the hook pin has a rotary shaft formed on an upper end of the insertion part;
the hook body has a shaft insertion hole in a longitudinal direction of the vehicle formed on an upper end of the fastening part; and
the rotary shaft is fitted into the shaft insertion hole and the hook pin is rotatably coupled to the hook body.

19. The hook assembly of claim 11, wherein:
a fixing projection is formed on both side surfaces of the insertion part to protrude in a longitudinal direction of the vehicle; and
in a state in which the insertion part is inserted into the insertion groove of the fastening part, the fixing projection is configured to open the fixing wing part to both sides of the fastening part.

20. The hook assembly of claim 11, wherein the lever part is inclined downward to face an outside of the vehicle in a width direction with respect to the insertion part.

* * * * *